United States Patent [19]

Skrentner

[11] 4,175,894

[45] Nov. 27, 1979

[54] BORING MACHINE

[75] Inventor: Frank C. Skrentner, Bloomfield Hills, Mich.

[73] Assignee: F. Jos. Lamb Company, Warren, Mich.

[21] Appl. No.: 907,684

[22] Filed: May 19, 1978

[51] Int. Cl.² ............... B23B 35/00; B23B 39/02; B23B 41/00
[52] U.S. Cl. .................................. 408/1 R; 82/1.2; 82/1.4; 408/8; 408/26
[58] Field of Search ............... 82/1.2, 1.4; 408/1, 408/8, 13, 26, 46, 51

[56] References Cited

U.S. PATENT DOCUMENTS

| 1,523,894 | 1/1925 | Pohle | 408/51 |
| 1,906,241 | 5/1933 | Arp | 408/1 |
| 2,195,645 | 2/1940 | Gairing | 408/26 |
| 2,247,284 | 6/1941 | Young | 82/1.2 |
| 3,152,394 | 10/1964 | Miller et al. | 408/26 |
| 3,169,416 | 2/1965 | Carlson et al. | 408/1 |
| 3,253,484 | 5/1966 | Hill | 408/46 |
| 3,443,458 | 5/1969 | Ohrnberger et al. | 82/1.2 |
| 3,884,590 | 5/1975 | Skrentner et al. | 408/8 |
| 3,902,386 | 9/1975 | Dressler et al. | 82/1.4 |

Primary Examiner—Harrison L. Hinson
Attorney, Agent, or Firm—Barnes, Kisselle, Raisch & Choate

[57] ABSTRACT

A boring machine has two spindle driven boring bars mounted on a common slide and supported by separate quills, each of which is movable relative to the slide. A stop on each quill locates its respective boring bar relative to a locating surface on the workpiece so that a cutting tool on each boring bar can be fed radially to machine the face of a counterbore at the desired depth relative to the locating surface on the workpiece. The machine includes a compensating mechanism for adjusting the cutting tools on each boring bar to compensate for tool wear.

22 Claims, 11 Drawing Figures

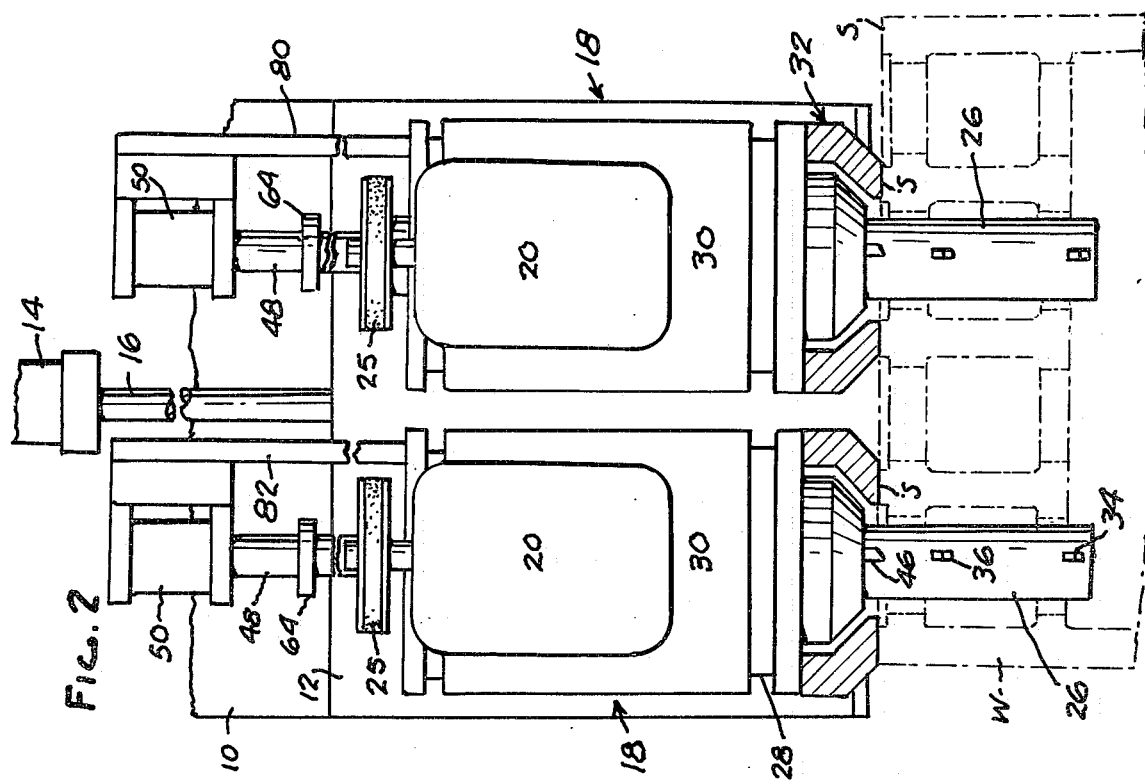
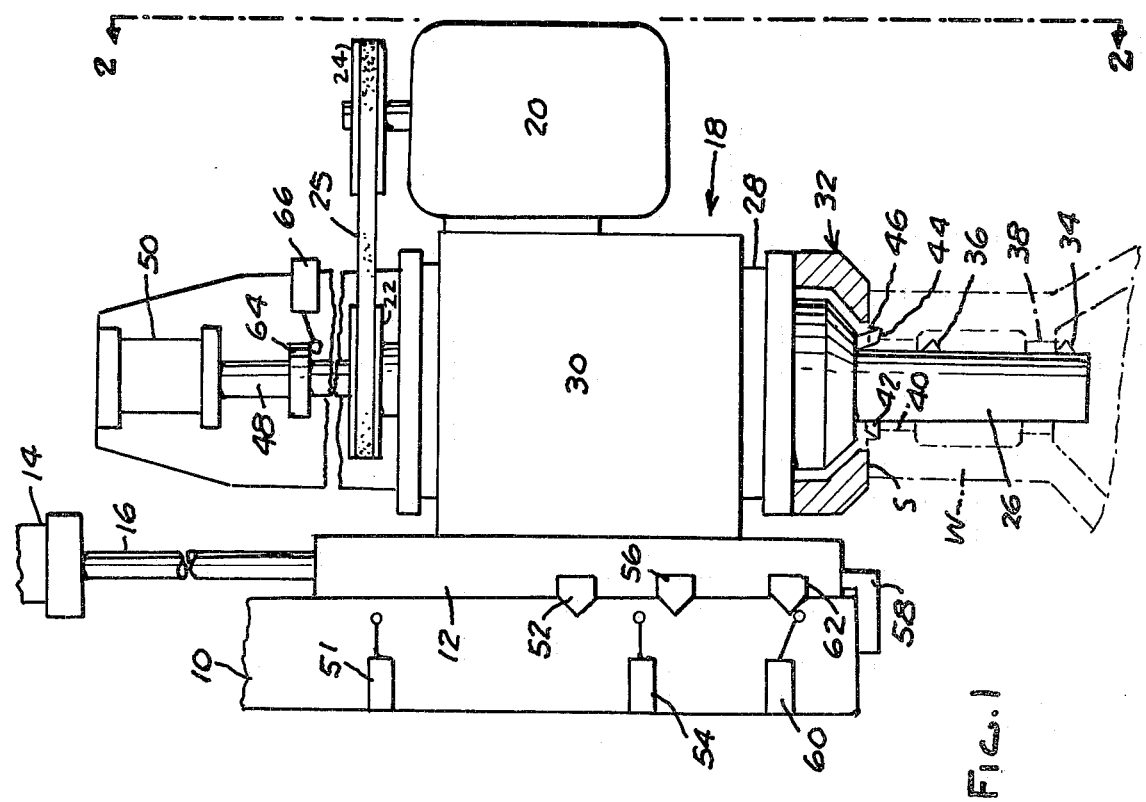

BORING MACHINE

This invention relates to a boring machine for boring holes with multiple diameters, and, more particularly, holes where one of the diameters is a counterbore whose precise depth dimension is measured from a reference plane on the workpiece, the precise location of which is unknown.

It is common in the metal machining industry to be required to machine a workpiece and maintain a dimension given from a reference surface other than the surface that the workpiece is supported on during machining. The problem is compounded by the fact that the dimensional tolerance between the workpiece support surface and the workpiece reference surface is frequently greater than the required tolerance of the dimension to be machined. This makes it mandatory to locate the dimension holding portion of the machine tool against the surface from which the machining dimension is given.

Another situation that can further compound this problem is where the surface from which it is necessary to locate the dimension is not a true plane. This can be caused by several factors, but mainly by the distortion of the workpiece resulting from the clamping of the workpiece on the machining fixture and/or by the forces generated by the machining cutter on portions of the workpiece that are not adequately supported. This non-planar surface will serve as a much better reference location if it is contacted by a stop on the machine that consists of several locating buttons that are gimbaled in such a way as to average the error of the plane.

A typical workpiece which presents the above problems is a cylinder block for an internal combustion engine, particularly a diesel engine block where liners are to be incorporated to define the piston bore. These liners have an enlarged flange at their upper end that is received by a counterbore in the top face of the block in such a way that the flange of the liner extends slightly above the top surface of the block casting. When the cylinder head is assembled to the engine block, the flange at the upper end of the liner will be pinched between the bottom of the counterbore and the underside of the head to form a metal seal which is both gas and liquid tight. This sealing requirement dictates that the cylinder head and the flanged end of the liner both be flat and the latter square with the bore. This in itself is not a difficult manufacturing problem; the portions of the arrangement requiring new techniques are the critical depth, squareness, and finish of the bottom of the counterbore. A single cylinder head extends over and seals several liner ends. This requires that all of the individual liner ends extend nearly the same amount above the top face of the cylinder block. This is controlled by the thickness of the liner flange and the depth of the counterbore. The bottom face of the liner flange has a critical seal requirement when it seats against the bottom of the counterbore and it is desirable that this bottom face of the counterbore be generated with a single point tool feeding radially at it rotates to produce a surface with spiral tool marks thereon. It is found that this surface must be flat and square with the axis of the bore, and, if not, it should have a slight conical taper which makes the counterbore slightly deeper as the diameter increases. Any taper in the opposite direction cannot be tolerated, and, to insure that this does not happen, the surface is preferably purposely generated with the desired taper.

With the machine of this invention, to maintain the critical depth of the counterbore the depth is gaged immediately after it is finish machined to determine if tool wear or other factors are tending to make it approach one of its tolerance limits. If required, the tool is automatically compensated in the proper direction to insure that the following workpieces are the proper size.

Considering that a cylinder block has many bores and the time required to machine a single bore, it is desirable to machine a plurality of bores simultaneously by utilizing a plurality of machine spindles on a single slide station of a transfer machine. As pointed out above, the depth of each of these counterbores must be individually controlled from the top surface of the cylinder block. Therefore the stop to perform this function cannot be on the slide that carries the multiple machine spindles, but must be on the individual spindles. In the present machine this is accomplished by utilizing a slideable quill in each spindle that carries the stop that individually controls the depth of each boring bar.

It is an object of the invention to provide a boring spindle and machine slide arrangement to precision bore with the same boring bar a hole of several diameters, one of which is a counterbore.

It is another object of the invention to machine the face of the counterbore with a single point tool that can generate a slight conical angle on the face.

It is a further object to provide a mechanism for compensating the single point facing tool for size change, while at the same time compensating the boring tools with a separate mechanism.

It is a further object to locate the depth of the counterbore from the surface from which it is dimensioned, utilizing a three point, gimbaled stop member, to average the errors in flatness of the surface.

It is still another object of the invention to simultaneously machine duplicate bores in the same workpiece, with the spindles mounted on the same slide but separately controlled for depth of the counterbore.

Other objects, features and advantages of the present invention will become apparent from the following description and accompanying drawings, in which:

FIG. 1 is a diagrammatic side view of a portion of a machine, with parts broken away, incorporating the invention;

FIG. 2 is a view along the line 2—2 of FIG. 1;

Figure 4:
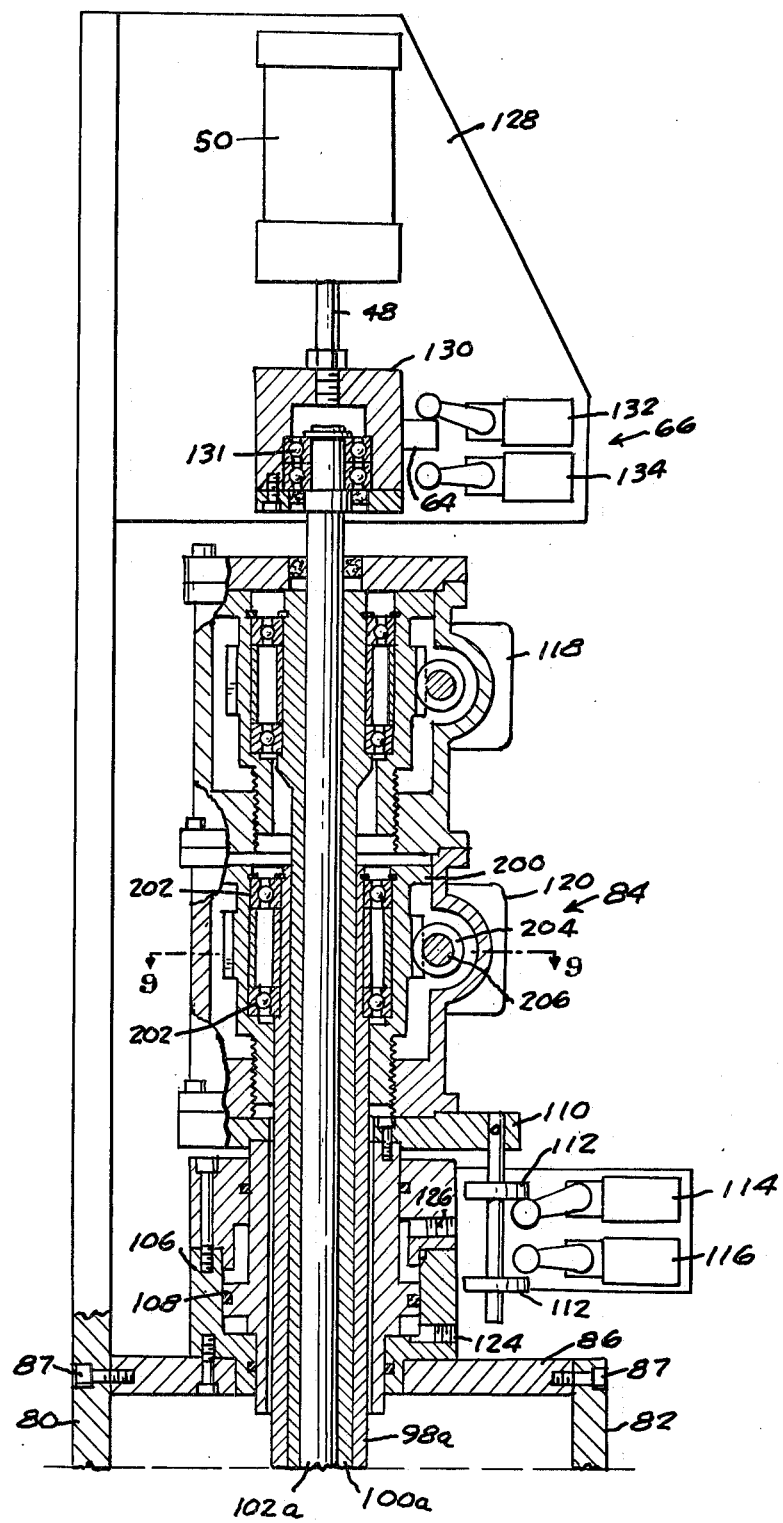
FIG. 4 is a fragmentary vertical sectional view through the cylinder and tool compensator on the machine and is an extension of the upper portion of FIG. 3.

FIGS. 1 and 2 are views of a machine embodying the invention showing the overall arrangement in a generally diagrammatic manner without structural details. In addition, the tool compensating mechanism shown in FIG. 4 is broken away and not shown in FIGS. 1 and 2. However, these views show sufficient structure to illustrate the general operation of the machine.

Referring to FIGS. 1 and 2, the machine includes a base 10 on which is slideably arranged for vertical movement a slide 12 powered by a cylinder 14 through a rod 16. FIG. 2 shows two separate spindle assemblies 18 mounted on a single slide 12. Each spindle assembly is rotated by its own motor 20 through pulleys 22,24 and belt 25. Each spindle assembly 18 includes a boring bar, generally designated 26, journalled within a quill 28 arranged for vertical sliding movement in a housing 30. Each housing 30 is fixed to slide 12. A stop assembly 32 is secured to the lower end of each quill 28 and is adapted to engage the top face S of the workpiece W around the hole to the machined. Each boring bar has mounted thereon cutting tools 34,36 for machining the straight vertical bores 38,40 in the workpiece. A third cutting tool 42 on each boring bar is adapted to machine the diameter of the counterbore 44 and a fourth cutting tool 46 is arranged to machine the face of counterbore 44 at the desired depth dimension measured from the top face S of the workpiece. Tool 46 is mounted on a tool slide, hereinafter described, but not shown in FIGS. 1 and 2, which is shiftable transversely of the boring bar in response to vertical reciprocation of a rod 48 of a hydraulic cylinder 50.

In the arrangement thus far described, at the beginning of a machining cycle slide 12 is fully retracted upwardly where it had been stopped at the end of the previous cycle by the tripping of switch 51 on base 10 by dog 52 on slide 12. Thus, each spindle assembly 18 is initially in a raised position and the two boring bars 26 are disposed above the workpiece W to allow its removal and replacement with another workpiece to be machined. When the cycle is initiated cylinder 14 will advance slide 12 downwardly at a rapid rate until switch 54 is tripped by dog 56. At this point the boring bar 26 is vertically positioned to start boring the diameters of bores 38,40. The workpiece has had these bores rough machined previously so that bore 40 is at least slightly larger than bore 38 to allow cutting tool 34 to pass through rough machined bore 40 during rapid advance of the slide. When switch 54 is tripped by dog 52 cylinder 14 advances slide 12 and the two spindle assemblies, together with their boring bars, at the desired feed rate to finish machine bores 38,40. While the slide 12 is advancing at the feed rate, tools 42 finish machine the diameters of counterbores 44 to the semifinished depth. When the semi-finished depth of each counterbore 44 has been reached, the respective stop assemblies 32 will contact the top face of the workpiece around each of the holes being machined. Since quills 28 are slideable axially in housings 30, after stop assemblies 32 contact the top face of the workpiece slide 12 is permitted to further advance downwardly a small amount before it contacts the fixed stop 58 on base 10. If the top surface S of the workpiece is not a true plane, the above-described arrangement will allow each spindle assembly and its boring bar to be individually located by the annular surface portion of the top face of the workpiece that immediately surrounds the hole that it is machining.

When slide 12 engages stop 58 switch 60 is tripped by dog 62 which initiates the downward stroke of rod 48 and advances cutting tool 46 in a radially outward direction to finish machine the face of counterbore 44 at the desired depth. After tool 46 has traversed the face of the counterbore 44 to the desired extent, a collar 64 on rod 48 actuates a switch mechanism 66 to radially retract tool 46. When both switch assemblies are tripped (being wired in series), cylinder 14 is actuated to return the slide to its retracted starting position where the tools clear the workpiece. The workpiece can then be advanced one increment of its bore pitch or advanced to the next identical machining station to machine the remaining bores.

The switches and dogs on the base 10 and slide 12 are shown diagrammatically and in practice are so arranged by offsetting or by swing dogs so that only the proper switch in the correct direction is engaged as described in this disclosure. The designs of particular electric and hydraulic circuits of the machine controls can vary widely. Since the design and arrangement of such controls are well known in the art of machine tools, they are not shown and specifically described.

Figure 3:
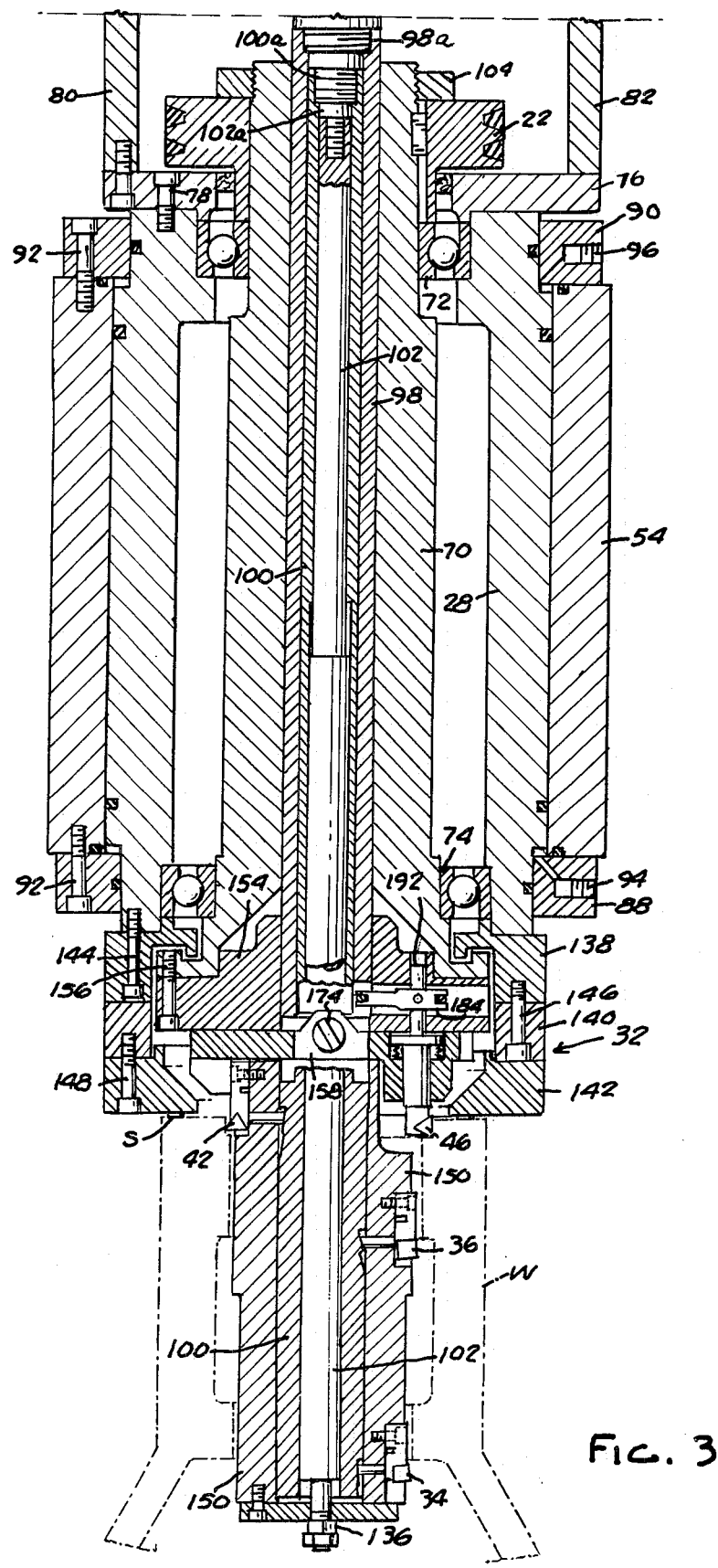
FIG. 3 is a fragmentary vertical sectional view through a spindle and boring bar of the machine.

FIG. 3 is an extension of the upper end of FIG. 4. Taken together, FIGS. 3 and 4 represent a vertical sectional view showing structural details of the machine. As shown in FIG. 3, pulley 22 is keyed to a hollow spindle shaft 70 which is supported for rotation within quill 28 by bearing 72,74. The upper end of quill 28 is fixedly connected to a plate 76 by screws 78. Plate 76 is in turn fixedly secured to the lower ends of upright support plates 80,82. A tool compensator assembly 84 (shown in FIG. 4 but broken away in FIGS. 1 and 2) is located above pulley 22 and is fixedly secured to a support plate 86. Plate 86 is spaced above plate 76 and extends between and is secured to upright support plates 80,82 by screws 87. End caps 88,90 are secured to the upper and lower ends of housing 30 by screws 92 and are in sealed sliding engagement with the reduced diameter ends of quill 28. Quill 28 has a close sliding fit within housing 30 and forms a piston which is adapted to be shifted vertically within housing 30 when fluid under pressure is introduced through either ports 94 or 96 formed in end caps 88,90, respectively.

Within the driven spindle shaft 70 there is slideably arranged a pair of concentric tubes 98,100 and within the inner tube 100 there is slideably arranged a drawbar 102. These tubes and the drawbar control the operation of the turning tools on boring bar 26 by means of the compensator assembly shown in FIG. 4.

Referring to FIG. 4, there is illustrated a cylinder 106 in which a piston 108 is slideably arranged. The upper end of piston 108 has attached thereto an adaptor plate 110 which carries two switch dogs 112 arranged to actuate switches 114,116. Two compensators 118, 120 are supported in tandem on adaptor plate 110. Compensator 120 controls the axial position of tube 98a and compensator 118 controls the actuation of tube 100a. A detailed description of the construction and operation of these compensators will be described hereinafter. Briefly stated, the function of these compensators is to make a small adjustment in the location of the cutting tools to compensate for tool wear. However, when port 124 on cylinder 106 is connected with fluid under pressure, piston 108 and both compensators 118,120 together with the tubes 98a and 100a will be shifted upwardly until switch 116 is actuated. When port 126 is connected to fluid under pressure, piston 108 and the components supported thereon will be shifted downwardly until switch 114 is actuated. These two movements will occur during each cycle of the machine. Piston 108 is shifted upwardly at the beginning of each machining cycle to position the cutting tools in the desired positions to machine the bores and counterbores. After the tools have finished their machining operations and tool 46 has been retracted radially, piston 108 is shifted downwardly and in the down position of piston 108 the cutting tools on the arbor for machining the bore diameters are retracted radially inwardly from the surface they have machined so that they will not generate an unwanted tool mark when the entire assembly is retracted vertically upwardly.

As shown in FIG. 4, cylinder 50 is mounted on a support plate 128 that is secured to the upright plate 80. The rod 48 of cylinder 50 is connected to the upper drawbar section 102a through a housing 130 and bearings 131. The previously referred to collar 64 is fixedly secured to housing 130 and the previously referred to switch assembly 66 comprises two switches 132,134. Vertical movement of drawbar 102 is controlled by interengagement of collar 64 with switches 132,134. When cylinder 50 shifts the drawbar downwardly its position is monitored by switch 134. Switch 134 is in turn located on plate 128 so as to be actuated by collar 64 when the piston in cylinder 50 engages an internal stop within the cylinder. When the drawbar is in its up position, switch 132 is actuated and this position is controlled by adjustable stop nuts 136 (FIG. 3) threaded on the lower end of the drawbar.

Referring now to FIG. 3, the previously referred to stop assembly 32 comprises three vertically stacked rings 138,140,142. Ring 138 is rigidly attached to the lower end of quill 28 by screws 144. Ring 140 is secured to the underside of ring 138 by screws 146 and the bottom ring 142 is secured to the intermediate ring 140 by screws 148. The detailed structure which forms the interconnection between these three rings will be described hereinafter.

Figure 5:
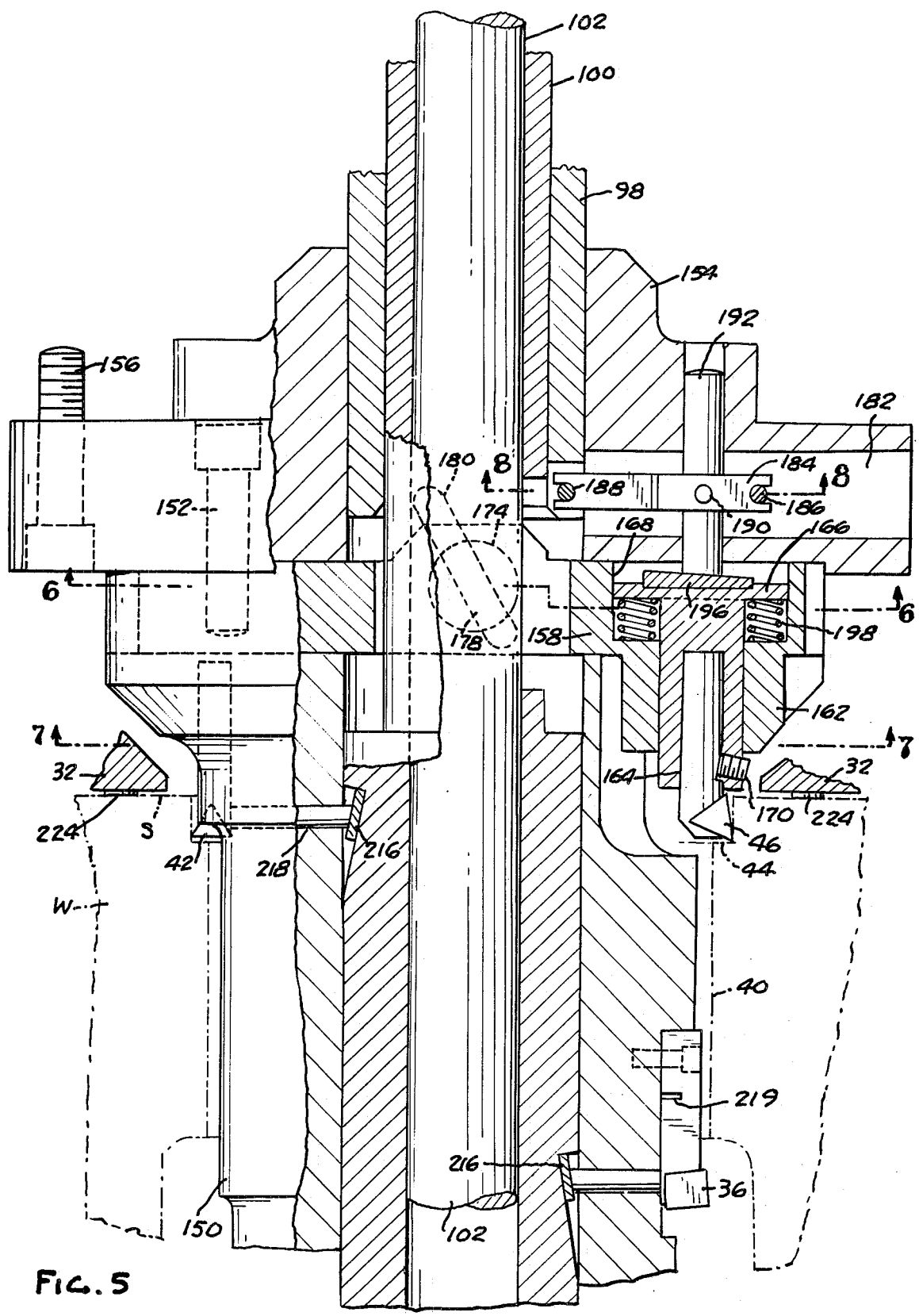
FIG. 5 is a fragmentary sectional view of the boring bar and cross slide.
Figure 6:
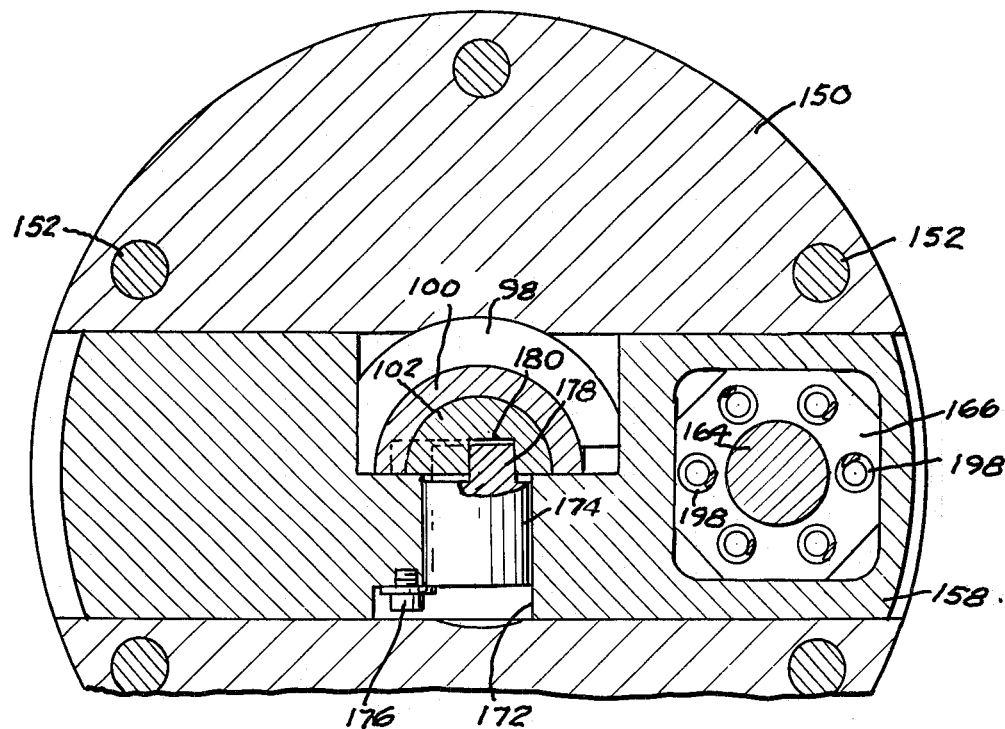
FIG. 6 is a sectional view along the line 6—6 of FIG. 5.
Figure 7:
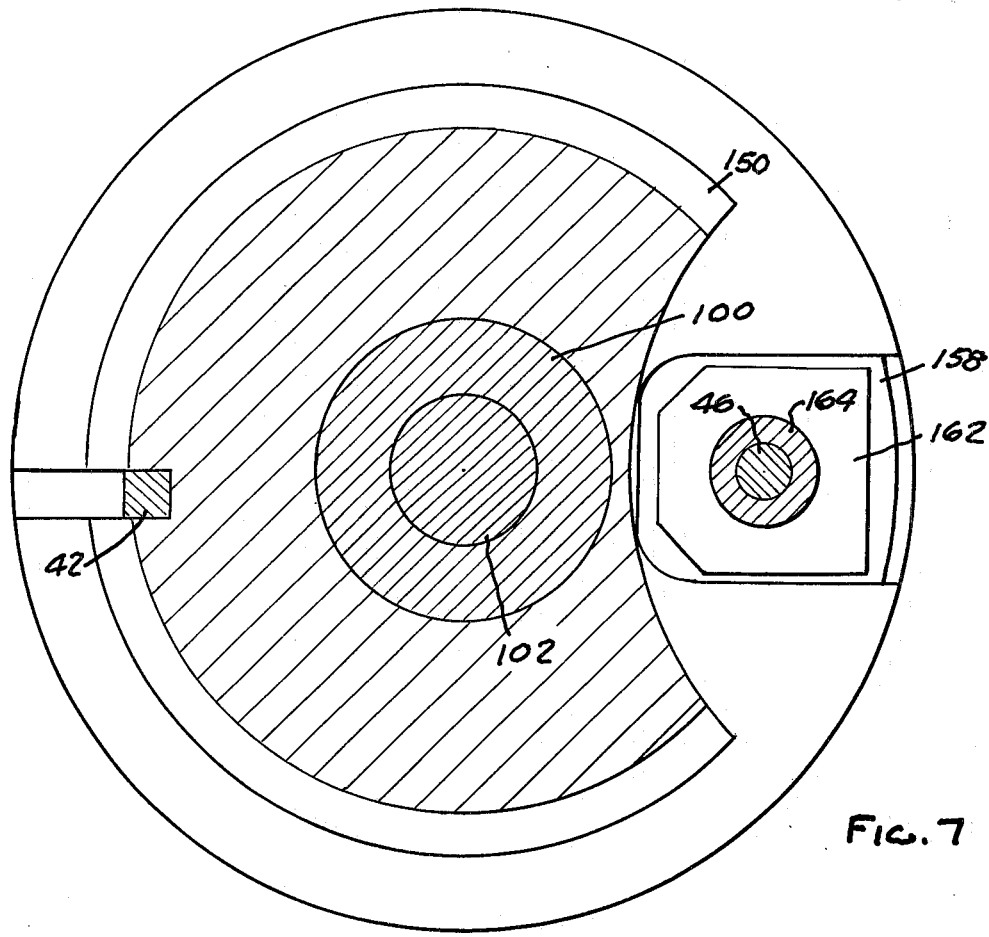
FIG. 7 is a sectional view along the line 7—7 of FIG. 5.

In FIG. 3 and 5 the boring bar proper is designated 150 and has secured to the upper end thereof, as by screws 152, an adaptor 154. Adaptor 154 is fixedly mounted on the lower of spindle shaft 70 by means of screws 156. A tool slide 158 is slideably mounted in a slot 160 extending transversely at the upper end of boring bar 150. Within a boss 162 on one end of tool slide 158 there is slideably arranged a tool holder 164. Tool holder 164 has a rectangular head 166 at its upper end which has a close sliding fit with a vertically extending rectangular bore 168 in tool slide 158. The cutting tool 46 is fixedly mounted in tool holder 164 by a set screw 170. As shown in FIG. 6, at the central portion thereof tool slide 158 is formed with a cross bore 172 in which is supported a cylindrical plug 174. Plug 174 is retained in bore 172 by a screw and washer 176. At its inner end plug 174 is formed with a rectangular key 178 which is engaged in a slot 180 formed in a cutaway flat portion of drawbar 102. As shown in FIG. 5, slot 180 is inclined to the axis of the drawbar so that the axial movement of the drawbar produces radial movement of tool slide 158.

Referring to FIG. 5, adaptor 154 is formed with a radial bore 182 in which is disposed a lever 184. At one end lever 184 is pivotally supported by a cross pin 186 in adaptor 154. At its opposite end lever 184 extends into a slot in the lower end of outer tube 98 and engages a pin 188 on tube 98. Intermediate its ends, lever 184 is pivotally mounted as at 190 on a follower pin 192 which is slideable axially on adaptor 154. The lower end of pin 192 engages the top angled face 194 of a hardened pad 196 secured to the head 166 of tool holder 164. With this arrangement it will be appreciated that any axial movement of tube 98 relative to boring bar 150 is translated into axial adjustment of cutting tool 46 relative to stop assembly 32. This enables precise control of the depth of counterbore 44. A plurality of springs 198 urges pad 196 against the lower end of follower pin 192 and, thus, eliminates all of the lash of the linkage assembly. While tools 34,36,42 are machining the diameters of the bores, drawbar 102 is in the down position and tool 46 is in its radially retracted position. When stop assembly 32 contacts the top face of the workpiece, pressure fluid is admitted to cylinder 50 to raise the drawbar and displace tool 46 radially outwardly at the desired feed rate. Thus, the single point tool 46 will generate a spiral cut across the face of the counterbore at the angle to the bore axis corresponding to the face angle on pad 196.

Figure 9:
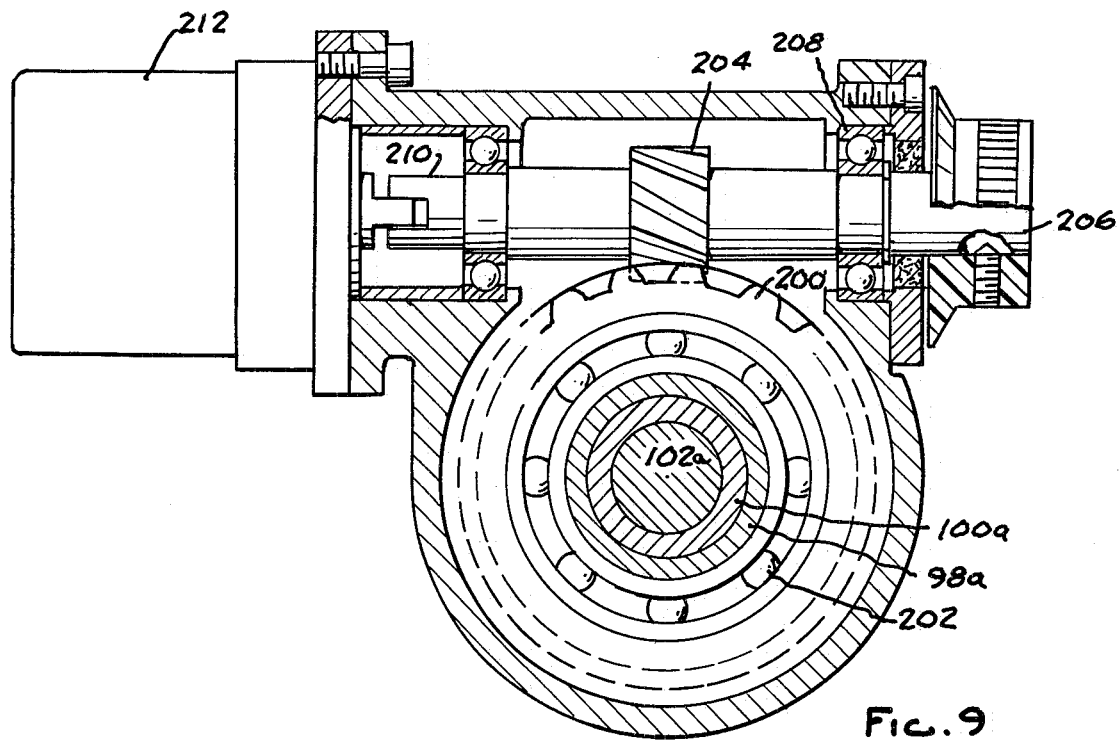
FIG. 9 is a sectional view along the line 9—9 of FIG. 4.
Figure 8:
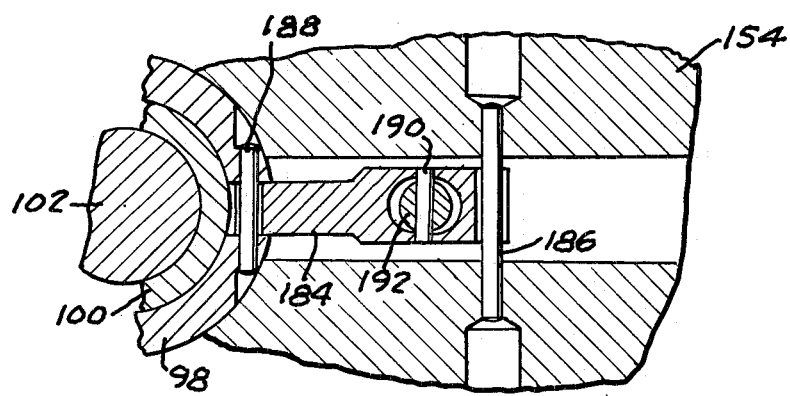
FIG. 8 is a sectional view along the line 8—8 of FIG. 5.

As is apparent from FIG. 4, the upper section 98a of tube 98 extends upwardly into compensator 120 where it is rotatably attached to gear 200 by bearings 202. Gear 200 is threaded into the compensator housing at its lower end and meshes with a worm gear 204 keyed to a shaft 206 (FIG. 9). Shaft 206 is journalled in the compensator housing by bearings 208 and is driven through a slot and tang coupling 210 by a geared motor 212. Motor 212 is of the type to produce a precise increment of output shaft rotation in response to a signal received from the control sytem which is initiated by automatic gaging or a manual push button. Motor 212 is of the reversible type therefore adapted to rotate gear 200 in either direction. Thus, through bearings 202 it is adapted to raise or lower tube 98 and thereby change the axial location of cutting tool 46. As pointed out previously, this will determine the precise depth of counterbore 44. A knurled and graduated dial 214 attached to the end of shaft 206 is provided to enable the initial adjustment of the machine or to manually change the depth of counterbore 44.

The compensator 118 is constructed identically with the compensator 120 and is adapted to effect vertical adjustment of the inner tube 100. In FIGS. 5 and 6 it will be noted that the tube 100 is cut away to the axial center line thereof to clear over the notched portion of tool slide 158. Below this notched portion tube 100 extends downwardly into boring bar 150. The lower end portion of tube 100 has wedges 216 thereon which are engaged by the inner ends of pins 218 slideable radially within the boring bar 150. The radially outer ends of pins 218 engage the shanks of cutting tools 34,36 and 42. When tube 100 is shifted upwardly from the position shown in FIG. 5, the shanks of these cutting tools are flexed radially outwardly. In order to reduce the amount of force required to flex these cutting tools outwardly, each of their shanks are partially bifurcated as at 219. Thus, as tube 100 is shifted vertically by compensator 118 each of the tools 34,36,42 are displaced radially. When all the tools have finished their cutting operation and cylinder 50 has retracted tool 46 radially inwardly, fluid under pressure is introduced into a port 126 of cylinder 106 (FIG. 4). This moves the two compensator assemblies downwardly and carries with them both tubes 98,100, thus retracting the cutting edges of all three tools so that the boring bar can be raised out of the workpiece without leaving tool marks on the finished surfaces.

Figure 10:
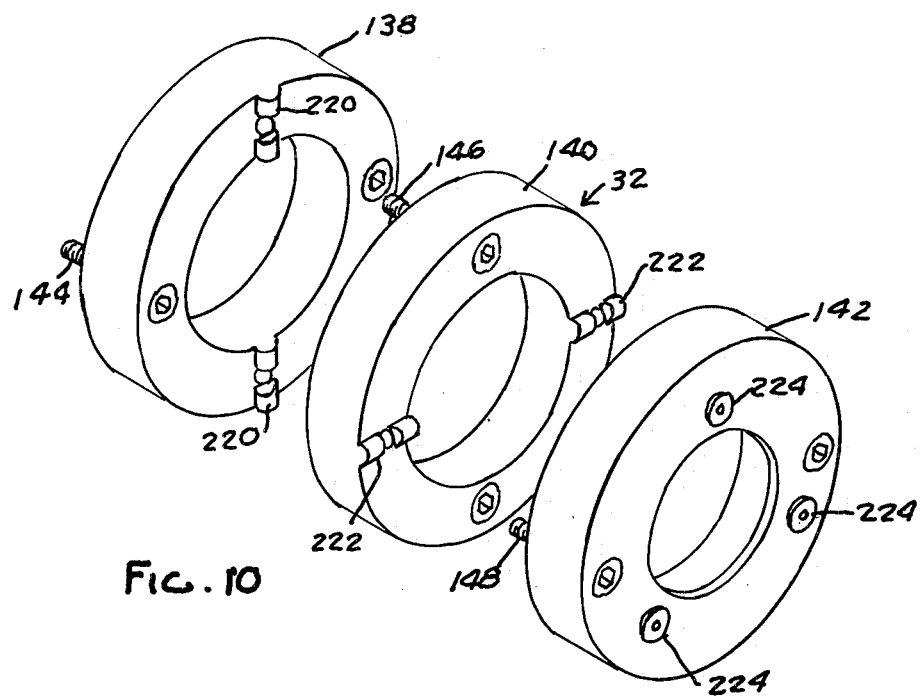
FIG. 10 is an exploded perspective view, somewhat diagrammatic, of the stop assembly of the invention.

FIG. 10 shows the three rings 138,140,142 forming the main elements of stop assembly 32 in an exploded perspective view. As pointed out previously, ring 138 is rigidly attached to quill 28 by screws 144. On its lower face ring 138 has formed a pair of diametrically opposite semi-cylindrical protrusions 220. For the purpose of illustration these protrusions are shown in FIG. 10 highly exaggerated. The protrusions 220 are engaged by the upper face of ring 140. The screws 146 which secure ring 140 to ring 138 are so located that they intersect the axis of the cylindrical protrusions 220 and thus permit a slight rocking movement of ring 140 on ring 138. Ring 140 has a pair of identical protrusions 222 formed on the lower face thereof which are disposed at right angles to the protrusions 220. Protrusions 222 are engaged by the upper face of ring 142 and screws 148 are located so that they will intersect the axis of the cylindrical protrusions 222. This will permit a slight rocking movement of ring 142 relative to ring 140. The assembly of these three rings provides a gimbal with at least a slight freedom of movement in any direction.

Figure 11:
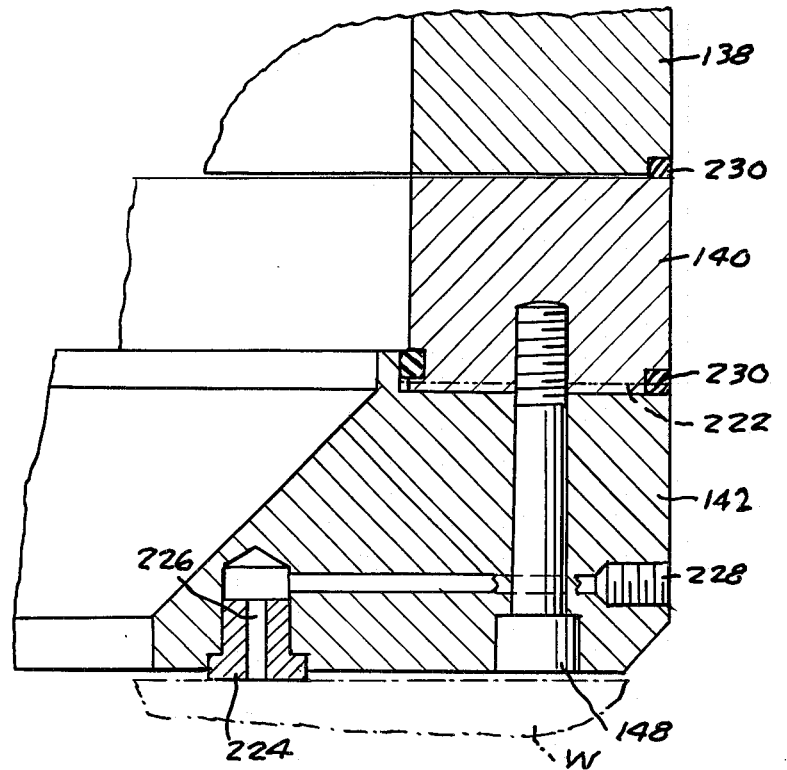
FIG. 11 is a fragmentary view of the stop assembly.

FIG. 11 shows the three rings 138,140,142 in assembled relation. The lower ring 142 has three rest buttons 224 on the lower face thereof for contacting the top face S of workpiece W. A conduit 226 extends through each of the rest buttons 224 and the lower ring 142 for connection with a source of air under pressure at port 228. At the time of rest buttons are approaching the workpiece, air is introduced into this conduit to blow away any dirt or chips and to insure that the contacting surfaces are clean. Elastomer rings 230 are arranged at the interfaces of the three gimbaled rings so that they will be held in an oriented relationship but will be free to flex enough to accommodate for any slight irregularities in the top surface of the workpiece. Each of the quills on the machine is provided with a stop assembly of this type at the lower end thereof. Therefore, each quill with be located by an average of the probably slightly non-planar surfaces of the workpiece adjacent to the hole to be bored. If the weight of the entire assembly is not sufficient to hold the stop assembly 32 firmly against the workpiece while facing of the counterbore is taking place, or if the reaction of the boring tools tend to shift the quill upwardly, fluid pressure may be introduced at port 96 (FIG. 3). This will be effective on the quill to urge the entire assembly downwardly. On the other hand, if the weight of the quill and all of the components carried by the quill is of a magnitude sufficient to distort the workpiece, fluid pressure may be introduced at port 94 to counterbalance a portion of this weight.

I claim:

1. A machine for machining counterbores in a workpiece comprising, a support, a boring bar rotatably mounted on said support, means for rotating the boring bar, means for moving the boring bar axially, a cutting tool mounted on the boring bar for machining the side wall of a bore in a workpiece in response to axial movement of the boring bar toward the workpiece, stop means, means mounting the stop means on the boring bar in an axially fixed position, said stop means being adapted to engage a locating surface on the workpiece extending transversely to the axis of the bore being machined to thereby limit movement of the boring bar in a direction toward said locating face, said boring bar being rotatable relative to said stop means, a cross slide mounted on the boring bar for movement radially of the axis of rotation of the boring bar, a second cutting tool mounted on the cross slide for machining the face of the counterbore in response to movement of the cross slide radially of the boring bar, a drawbar extending axially within the boring bar, means for shifting the drawbar axially relative to the boring bar when the stop means engage said locating face, and means interconnecting the drawbar and cross slide for shifting the cross slide radially in response to said axial movement of the drawbar to thereby machine said face of the counterbore at precise depth relative to said locating face.

2. A machine as called for in claim 1 wherein said means interconnecting the drawbar and the cross slide comprises cam and cam follower means.

3. A machine as called for in claim 2 wherein said cam and cam follower means comprises a cam and cam slot in said drawbar and cross slide, said cam slot being inclined to the axis of the boring bar.

4. A machine as called for in claim 1 including a tool holder for the second cutting tool mounted for movement on the cross slide in a direction parallel to the axis of the boring bar and means fixed radially on the boring bar and engaging said tool holder for causing axial movement of the second cutting tool in response to radial movement of the cross slide.

5. A machine as called for in claim 4 wherein at least one of said radially fixed means and said tool holder has a face contacted by the other which is slightly non-perpendicular to the axis of the boring bar whereby the second cutting tool machines the face of the counterbore with a slight conical taper in response to radial movement of the cross slide.

6. A machine as called for in claim 5 wherein said non-perpendicular face causes the second cutting tool to machine the face of the counterbore with a taper such that the depth of the counterbore increases progressively in a radially outward direction.

7. A machine as called for in claim 1 wherein said means for shifting the drawbar axially are adapted to feed the second cutting tool radially outwardly when the stop means engages said locating face of the workpiece.

8. A machine as called for in claim 1 wherein said stop means comprises a gimbal ring assembly connected to said boring bar for limited pivotal movement relative to the axis of the boring bar.

9. A machine as called for in claim 1 wherein said means mounting the stop means on the boring bar comprises a quill movable axially on said support in a path parallel to the axis of the boring bar, said boring bar being journalled for rotation on said quill.

10. A machine as called for in claim 9 wherein said stop means are mounted on said quill for at least slight universal pivoting movement.

11. A machine as called for in claim 9 wherein said stop means comprises a first ring having means thereon engageable with said locating surface on the workpiece, a second ring fixedly connected to said quill, and a third ring connected to said first ring for pivotal movement about a first axis perpendicular to the axis of the boring bar and connected to the second ring for pivotal movement about a second axis perpendicular to the axis of the boring bar and displaced 90° from the first axis.

12. A machine as called for in claim 11 wherein said means on the second ring for contacting said locating surface comprises at least three circumferentially spaced pads.

13. A machine as called for in claim 12 wherein said pads are located on a circle having a diameter slightly greater than the diameter of the bore machined by the first-mentioned cutting tool.

14. A machine as called for in claim 1 wherein said first and second cutting tools are located in generally the same radial plane along the axis of the boring bar.

15. A machine as called for in claim 14 including a third cutting tool on the boring bar spaced axially from the first and second cutting tools for machining the side wall of a second bore on the workpiece concentric with and spaced axially from said counterbore.

16. A machine as called for in claim 1 including a second boring bar rotatably mounted on said support with its axis parallel to the axis of the first-mentioned boring bar, said boring bars being of the same construction and each being rotatably mounted on a quill in axially fixed position, each quill being mounted independently of the other for axial movement on said support, said stop means being mounted one on each quill, said means for moving the boring bars comprising means for moving said support in a path parallel to the axis of the boring bars whereby axial movement of each boring bar relative to said support is arrested independently of the other when each stop means contacts its respective locating surface on the workpiece so that the dimension between the face of each counterbore and its respective locating surface is determined by the axial distance between each of the second-mentioned cutting tools and the stop means on the respective quills.

17. A machine as called for in claim 16 wherein said support comprises a slide having a pair of housings fixed thereon in which the quills are mounted for axial movement, a base on which said slide is slideably mounted and means on said base engageable with said slide for arresting movement of the slide after both of the stop means have engaged their respective locating surfaces on the workpiece.

18. A machine as called for in claim 17 wherein each stop means is mounted on its respective quill by means of universal pivot means.

19. A machine as called for in claim 17 wherein each stop means comprises at least three pads mounted on each of the quills by a pair of gimbal rings.

20. A machine as called for in claim 19 wherein said pads are spaced apart circumferentially on a circle having a diameter slightly greater than the diameter of the bore machined by the first-mentioned cutting tool on its respective boring bar.

21. The method of machining a counterbore around an opening in a workpiece to a precise depth measured from a locating surface on the workpiece extending around the opening which comprises: mounting a first and a second cutting tool on a rotatable boring bar at generally the same radial plane spaced axially from a stop on the boring bar adapted to engage said locating surface when the boring bar is advanced axially into said opening, the first cutting tool having its cutting edge spaced radially from the axis of the boring bar such as to machine the side wall of the bore to its desired diameter and the second cutting tool being located radially inwardly of the first cutting tool with its cutting edge spaced axially from said stop a distance corresponding to said depth dimension; rotating the boring bar and simultaneously introducing it into said opening and advancing it axially to interengage the stop of the boring bar with said locating surface to thereby cause the first tool to machine the side wall of the counterbore; and, while said stop is engaged with said locating surface, feeding the second cutting tool radially outwardly to machine the face of the counterbore to the precise depth relative to said locating surface.

22. The method of simultaneously machining two counterbores around two laterally spaced openings in a workpiece, each to a precise depth measured from locating surface on the workpiece extending around each of the openings which comprises: mounting two boring bars on a movable support for independent sliding movement along parallel axes spaced apart laterally a distance corresponding to the distance between the axes of the two counterbores to be machined; mounting on each boring bar first and second cutting tools which are located in generally the same plane on each boring bar spaced axially from a stop on each boring bar adapted to engage the respective locating surfaces around each opening, the first cutting tool on each boring bar having its cutting edge spaced radially from the axis of its respective boring bar to machine the side wall of the respective counterbore to the desired diameter, the second cutting tool on each boring bar being located radially inwardly of the first cutting tool with its cutting edge spaced axially from the stop on the respective boring bar a distance corresponding to the depth of the respective bore to be machined; rotating said boring bars and simultaneously moving said support in a rectilinear path parallel to the axes of the boring bars toward the workpiece to introduce the two boring bars into the two openings in the workpiece; continuing movement of the support at least slightly beyond its position when the last of the two stops engages its respective locating surface on the workpiece such that each of the first-mentioned cutting tools machines the side wall of its respective counterbore to at least the approximate depth of the counterbore; and, thereafter, feeding each of the second tools radially outwardly to machine the face of each counterbore to the precise depth relative to its respective locating surface.

* * * * *